United States Patent [19]

Adler

[11] Patent Number: 4,543,021
[45] Date of Patent: Sep. 24, 1985

[54] SAFETY SHIELD FOR A MILLING MACHINE, DRILL PRESS, AND THE LIKE

[76] Inventor: David T. Adler, 110 Dumbarton Dr., Huntington, N.Y. 11743

[21] Appl. No.: 650,057

[22] Filed: Sep. 13, 1984

Related U.S. Application Data

[63] Continuation-in-part of Ser. No. 431,006, Sep. 30, 1982, abandoned.

[51] Int. Cl.[4] ................................................. B23C 9/00
[52] U.S. Cl. ............................. 409/134; 29/DIG. 86; 51/272; 144/251 R; 408/241 G
[58] Field of Search ............................. 408/241 G, 710; 409/134; 51/268, 269, 272, 274; 144/251 R; 83/440.2, 478, 544, 545, 546, 860; 29/DIG. 86, DIG. 56

[56] References Cited

U.S. PATENT DOCUMENTS

| | | | |
|---|---|---|---|
| 1,148,397 | 7/1915 | Nelson | 409/134 |
| 1,527,998 | 3/1925 | Serpico | 409/134 |
| 2,165,142 | 7/1939 | Jeffreys | 51/272 |
| 2,315,132 | 3/1943 | Powers | 51/272 |
| 2,604,823 | 7/1952 | Szypulinski | 51/272 |
| 2,825,268 | 3/1958 | Manbro et al. | 51/272 |
| 4,043,701 | 8/1977 | Jaeger | 408/241 G |
| 4,126,081 | 11/1978 | Zdeb | 409/134 |
| 4,132,497 | 1/1979 | Weller et al. | 408/241 G |
| 4,162,647 | 7/1979 | Aslen | 408/241 G X |
| 4,343,115 | 8/1982 | Stabler et al. | 144/251 R X |

FOREIGN PATENT DOCUMENTS

| | | | |
|---|---|---|---|
| 2452354 | 11/1980 | France | 51/268 |
| 24203 | of 1914 | United Kingdom | 83/860 |
| 568432 | 8/1945 | United Kingdom | 408/241 G |

*Primary Examiner*—Gil Weidenfeld
*Assistant Examiner*—Glenn L. Webb
*Attorney, Agent, or Firm*—Charles I. Brodsky

[57] ABSTRACT

A safety shield, adapted for securement to a milling machine, drill press, and the like, is rotatable to permit easy access to a workpiece, and is provided with a drag resistance to such rotation to prevent inadvertent return of the safety shield to the original workpiece area when not so desired.

6 Claims, 2 Drawing Figures

SAFETY SHIELD FOR A MILLING MACHINE, DRILL PRESS, AND THE LIKE

This application is a continuation-in-part of application Ser. No. 431,006, filed Sept. 30, 1982, abandoned.

FIELD OF THE INVENTION

This invention relates to milling machines, drill presses, and like machine shop equipments and, more particularly, to a safety shield for use therewith in providing a high degree of worker protection.

BACKGROUND OF THE INVENTION

As is well known and understood, government regulations more and more mandate the use of safety shields to afford protection to the operators of machine shop equipments. Usually positioned in use such that the shield is in the workman's line of sight to the piece being machined, these shields are generally made of a heavy plastic, see-through, material, bent to protect the worker, and oftentimes, those who may be in areas immediately adjacent to his. As is also well known and understood, however, there is much resistance to the use of these shields—one of the reasons being the inherent delay in having to continually adjust and re-adjust the shield positioning every time a workpiece is loaded onto, and removed from, the machine in question. Presently available safety shields as are used today also suffer the disadvantages of either being time consuming in their respective set-ups, or overly cumbersome in their alignment or orientation with the workpiece and machine in connection with which they are operative—oftentimes being arranged by a series of connecting rods and links for desired positionings.

SUMMARY OF THE INVENTION

As will become clear hereinafter, the safety shield of the present invention offers the decided advantage of being adaptable for securement to a wide variety of machine shop equipments, independent of their size and shape. A rotatable shaft is provided, which permits the shield to tilt upwardly (once it is secured to the machine equipment), so as to provide easy access to the workpiece. A compressible spring and fastener are interconnected with the shaft, to provide a drag resistance to the shaft rotation, so as to maintain the shield in a "tilt-away" position when such access is had, without holding on to the shield to retain it in position. A coupling arrangement is further provided, in one embodiment, between the fastener and compressible spring, so as to permit the safety shield to be held secured to the machine housing (or other suitable location) by any acceptable interconnect—and, especially, by a Flexbar positioning device, as is available from Flexbar Machine Corp., of Farmingdale, N.Y.

In accordance with this construction of the invention, a plurality of stanchions, or support posts, couple the rotating shaft to the shield material itself, with individual spacer supports circumventing the rotatable shaft between adjacent stanchions, in giving a degree of rigidity to the construction. If desired, and in accordance with this embodiment of the invention, a pair of plastic washers are affixed to the rotatable shaft, on either side of the compressible spring, as a means of extending the usefulness of the construction in operation. As will be seen, the intercoupling provided is effective to maintain the safety shield in proper position with respect to the machine equipment with which it is used, while the fastener and compressible spring control the drag resistance on the rotatable shaft so as to restrict the rotation of the shield once it is positioned with respect to the workpiece being operated upon.

In accordance with a preferred embodiment of the invention, on the other end, an additional spacer support is employed, with coupling arrangement to the machine housing being between that added spacer support and the compressible spring. With a locking element then being installed between the opposite end of the compressible spring and the fastener, this preferred arrangement provides the advantageous feature of affording almost a constant drag resistance on the rotatable shaft even over repeated rotations of the safety shield when in use.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
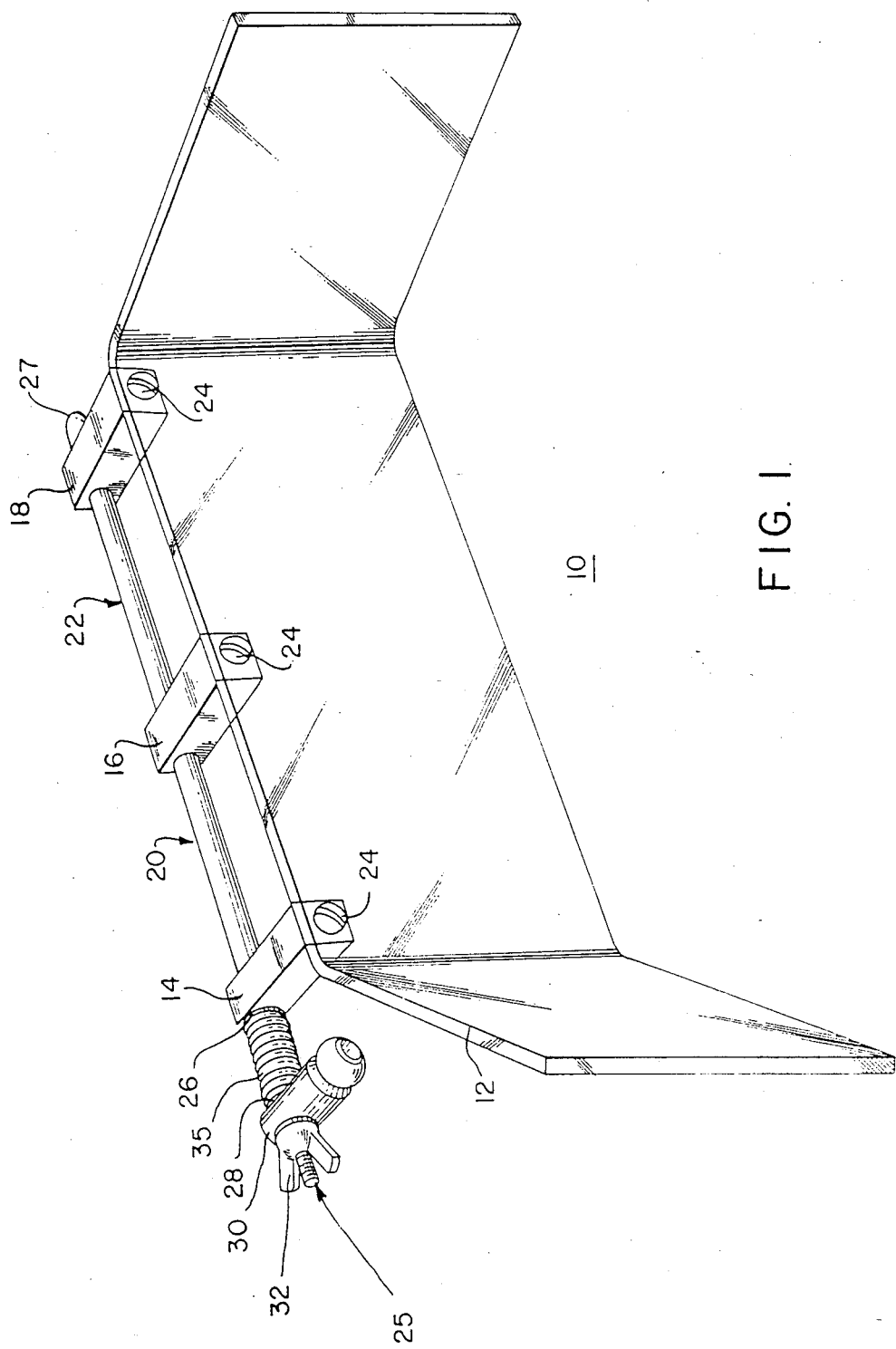
FIG. 1 shows a perspective view of a safety shield for a milling machine, drill press, and the like, embodying the present invention.

In FIG. 1, and for purposes of illustration, the safety shield 10 incorporates a "see-through", unbreakable sheet of Lexan polycarbonate material, some 10.375 in. across and with 45° bends of some 3.75 in. dimension. Three stanchions (or support posts) 14, 15 and 18 are shown, secured—as by means of bolts 24—to the upper section of the Lexan sheet 12 at, for example, 0.500 in. down from its upper edge. Spaced at 4.500 in. centers for the extent of sheet described, it will be apparent that additional stanchion supports and securing bolts would be similarly positioned where the safety shield is of larger dimension, so as to facilitate its use on larger machine equipments than the Bridgeport type vertical turret machine in connection with which the shield of the drawings was designed.

As indicated, the stanchion supports 14, 16 and 18 are provided with a through-aperatue to accept a shaft 25, having a cap end, at 27, and a threaded extension for receiving a fastener 32. In assembling the shaft 25 in position, a pair of larger diameter spacer supports 20, 22 are employed, with the arrangement being, as shown, one where the shaft extends through the stanchions 14, 16 and 18, and through the larger diameter spacer supports 20, 22, to terminate with the fastener 32. Although not absolutely necessary in the use of the invention, the spacer supports 20, 22 are provided to limit a "bending moment" otherwise produced by action of the fastener 32 (as will be described below)—and, in this manner, extend the life of the construction.

Also shown in the invention embodiment of FIG. 1 are a compressible spring 35, a pair of washers 26, 28, and an inter-coupler 30. As indicated, the compressible spring 35 circumvents the shaft 25, and is situated between the washers 26, 28—whose inclusion, although not essential to the operation of any drag resistance exhibited, again serves to add to the life (and thus, the extent of use) of the safety shield construction. The inter-coupler 30, on the other hand, may be any suitable adaptor which serves to secure the safety shield construction to the milling machine, drill press, etc., in conjunction with which the shield is operating. Thus, for example, the inter-coupler 30 may be connected by a series of rods, links, knuckle joints, etc. to an existing hole in the Bridgeport type machine alluded to above, alongside it quill housing, there existing for machine tool indicating purposes. Alternatively, the inter-coupler 30 could connect to any available point on the machine equipment with which the safety shield is to be used, or to adaptors placed thereon if none be provided on the equipment itself. Rather than secure to such machines by a connecting rod-link-knuckle joint combination—or by a series of floating ball joints or other such coupling configurations—, applicant has found that the inter-coupler 30 could very easily secure to a flexible positioning device as manufactured by Flexbar Machine Corp., of Farmingdale, N.Y., which affords a large number of articulations which can be adjusted in a single motion to be held firmly in place, to any orientation and placement desired.

With the arrangement of FIG. 1, and in furtherance of its use, the inter-coupler 30 (along with its connection to the milling machine, drill press, etc.) is first arranged so that the front portion of the shield 12 faces the workpiece when in place, oriented generally vertically, as shown, for one use of the invention, and providing a see-through capability for the operator positioned rearwardly of the shield 12 through such shield to the workpiece in question. With the shield 12 of appropriate height, and with its bends of sufficient length, any metal, or other component parts of the piece being operated upon, will thus be prevented, by the shield 12, from reaching the operator standing behind the shield 12, or the areas immediately to the left, or to the right, of such operator. The fastener 32 (such as a wing nut, for example) is then adjusted on the threaded portion of the rotatable shaft 25, so as to bear against the inter-coupler 30, and begin to compress the spring 35. However, prior to the tightening of the fastener 32, it will be understood that the relative dimensionings of the diameter of the shaft 25 with respect to the through-apertures of the stanchions 14, 16, 18 permit an easy rotation of the shaft 25 through the stanchions 14, 16, 18, such that the shield 12 can be freely tilted upwardly towards the operator, without resistance, about the shaft 25 as an axis, the rotation afforded being translated by way of the stanchions illustrated.

By tightening the fastener 32, on the other hand, the compression of the spring 35 serves to exert a drag resistance on the otherwise free rotation of the shaft 25, to an extent, such that in the ultimate, any degree of rotation about the shaft 25 is fully inhibited. As will be apparent, without any compression resistance, once the shield 12 is aligned at a position other than straight downwardly, gravitational forces exist to, themselves, rotate the shield back to its original, hanging position. Thus, if there were no resistance to the rotation provided, any attempt by the operator of the machine to tilt the shield 12 upwardly, and towards him, in an attempt to get at the workpiece, would result in the shield just falling back to its original place, unless held in position by the operator, or by some other holding manner.

In accordance with the invention of FIG. 1 though, the continuing compression of the spring 35 by the fastener 32 continuously increases the drag resistance on the rotatable shaft 25, to the extent that a point is reached, beyond which further adjustment of the fastener 32 serves to restrain the free rotation of the shaft 25, and, thusly, hold the shield 12 in place, no matter its angle of orientation, independent of any need to hold it from falling. In this manner, the operator can rotate the sheld 12 towards him, entirely upwardly to extend "straight-up", (or, in the worst case, to a position where the shield extends parallel to the floor, horizontally), with the resistance drag of the compression spring 35 being such as to hold the shield 12 firmly in position. Although the resistance drag will be not so great as to prevent the operator from rotating, as by tilting, the shield 12 towards him (i.e., away from the workpiece) when it is desired to get easy access to the workpiece, the resistance drag will then be sufficient to prevent the shield from undesirably returning to its original position due to its own weight, or inadvertently, if accidently bumped. With the inter-coupler 30 and its connects to the machine equipment (either by a Flexbar or other apparatus) properly set, all the operator need do in the loading or unloading of the machine, is to rotate the shield 12 about the shaft 25 as an axis towards or away from the workpiece area in positioning the part in place. Once rotated away, the shield 12 remains stationery, without the need for holding it in position and the workpiece in question can be simply and easily loaded into the machine, or removed from it. A very quick, very smooth emplacement procedure thus results, which is both extremely time efficient and industrially safe in implementation.

As will be readily apparent, the compression of the spring 35 by the interaction of the fastener 32 and the inter-coupler 30 tends to produce a bending moment upon the stanchions 14, 16, 18 which couple the shield 12 to the rotatable shaft 25. Although not a requirement to providing the resistance drag to the rotation previously described, the spacers 20, 22 serve to absorb and restrict this bending moment, in providing a support to the construction, in extending its life. Provision for the resistance drag to the rotation will continue to be had, likewise, without the washers 26 and 28 being in position—but, their inclusion also serves the purpose of extending the life and usefulness of the safety shield, when in use. Of course, by removing the fastener 32 from the construction shown, the entire shield arrangement can be removed from the inter-coupler 30, so as to permit a differently configured shield construction to be substituted, if warranted by the nature of the workpiece being operated upon by the machine in question—with the fastener 32 then being adjusted anew, so as to hold such substituted shield construction again in position. And, if the connect to the inter-coupler 30 is provided by way of the flexible positioning Flexbar device noted previously, removal of the opposite end of the Flexbar unit in an appropriate manner from the machine with which the sheild apparatus is then operating, can permit easy transfer of the same shield construction to a different machine which the operator seeks to use, with the simple re-connection of the Flexbar to that alternate machine being easily transacted, such that the shield can then be employed in exactly the same manner as before, but, this time, on a different piece of machine shop equipment.

While the safety shield construction of FIG. 1 has worked admirably well, applicant has noted a tendency for the drag resistance to become degraded over repeated raising and lowerings of the shield 12. Experimentation and investigation has indicated that this degradation follows from the reverse-pressure exerted by the compressible spring 35 in attempting to unravel towards its original, unstressed condition. Testings, moreover, have indicated that the tendency to unravel increases as the compressible spring 35 is made "stiffer", of a heavier tension. Experimentation indicated that the "stiffer" the spring, the fewer the times the imparted drag resistance would be sufficient to maintain the shield 12 in any upwardly angulated position.

Figure 2:
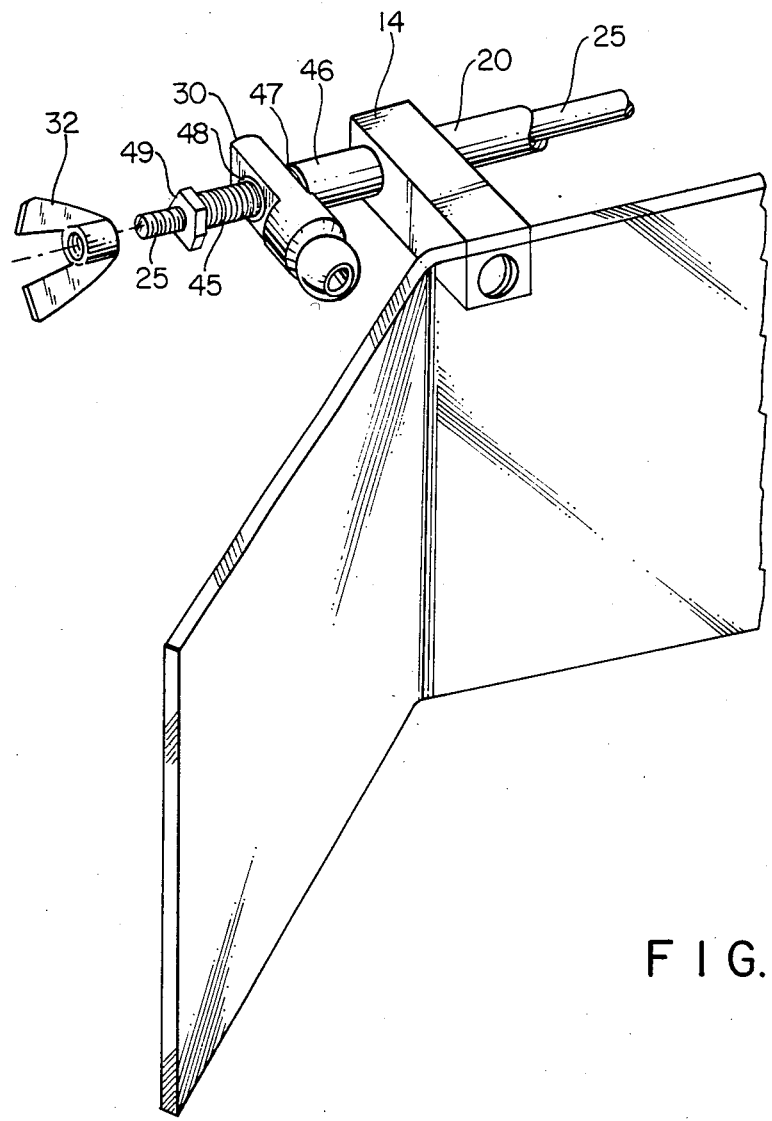
FIG. 2 shows a partial perspective view helpful in an understanding of a preferred embodiment of the safety shield apparatus.

In the preferred embodiment of the shield construction of the invention shown in FIG. 2, on the other hand, a less-stiff, lighter spring 45 is employed, along with an additional spacer support 46 encircling the shaft 25. The inter-coupler 30 is arranged, along with a pair of washers 47, 48, between the compressible spring 45 and the spacer support 46 with the tightening being effectuated, as before, by means of the adjustable fastener 32. However, a locking element 49 (illustrated by a hex nut in FIG. 2) is interspersed between the compressible spring 45 and fastener 32. An appropriate installation of the FIG. 2 construction has been found to include the assembling of the spacer 46, the washer 47, the inter-coupler 30, the washer 48 and the compressible spring 45 on the shaft 25, the threading of the locking element 49 onto the shaft 25 until the compressible spring 45 is bottomed out, a threading of the adjustable fastener 32 against the locking element 49, and the using of an openend wrench, for example, to lock the element 49 against the near side of the fastener 32.

With the construction illustrated in the partial perspective view of FIG. 2, investigation, experimentation and testings have shown almost a total absence of any tendency for the compressible spring 45 to unravel during repeated liftings-and-lowerings of the shield 12 when used by the machine operator. The drag resistance on the shield 12 thus remains substantially constant over long periods of usage, a decided advantage over other described protective shields whose attempts to stabilize the drag resistance have by-and-large focussed around the use of these aforementioned "stiff" springs which, however, suffer the problems noted previously. The arrangement thus illustrated in FIG. 2 will be seen to represent a preferred embodiment of the shield construction of this invention.

Whereas, applicant has described what are considered to be highly desirable embodiments of the present invention, it will be readily appreciated by those skilled in the art that modifications can be made without departing from the scope of the teachings herein of providing an adjustable resistance drag to a machine safety shield as part of its rotation, in simply and easily orienting the shield in place during the loading and unloading of a workpiece into the machine being utilized. Thus, while the invention has been described in the context of a safety shield which is arranged to rotate upwardly and downwardly in its use, it will be equally seen that the teachings of the invention also can be applied for those machine equipments where a safety shield might be installed, and moved toward or away from the workpiece horizontally (i.e., sideways away), with the resistance drag then effective to prevent inadvertent or accidental, dislodgement of the shield (by banging, bumping, or otherwise) in a direction back towards the machine during its loading or unloading by an operator.

For at least such reasons, therefore, resort should be had to the claims appended hereto for a correct understanding of the scope of the invention.

I claim:

1. A safety shield for milling machine, drill press and like equipments, comprising:
   a protective shield;
   a shaft;
   a plurality of support members apertured to receive said shaft and coupled to said shield to rotate said protective shield about said shaft as an axis;
   a plurality of spacer supports also apertured to receive said shaft and coupled between adjacent ones of said support members on said shaft;
   first means coupled to said shaft for connecting said protective shield to the one of said milling machine, drill press and like equipments with which said protective shield is to be used at any given instand of time;
   a compressible spring on said shaft having a first end portion to bear against said first means, and also having a second end portion;
   an adjustable fastener movable along said shaft in exerting a compressive force against said compressible spring;
   second means intercoupled between said second end portion of said compressible spring and said adjustable fastener for securely locking said spring to the compressed position established by the movement of said adjustable fastener along said shaft; and
   an additional spacer support apertured to receive said shaft, coupled between said first means and the one of said support members most proximate to said first means along said shaft;
   whereby the movable adjustment of said fastener along said shaft in a direction to secure said protective shield for use, exerts a compressive force on said compressible spring via said second means to provide an adjustable drag resistance on said protective shield in limiting the rotational freedom of said protective shield about said shaft as an axis.

2. The protective shield of claim 1 wherein said shaft is threaded along an extent thereof, and wherein said adjustable fastener comprises a wing nut movable along the threaded extent of said shaft in exerting a compressive force against said compressible spring.

3. The safety shield of claim 2 wherein said second means comprises a hexagonal nut also movable along the threaded extent of said shaft.

4. The safety shield of claim 1 wherein there is additional included a pair of washer means coupled on either side of said compressible spring.

5. The safety shield of claim 1 wherein said shaft is of a circular cross-section of a given diameter, and wherein said spacer supports are also of a circular cross-section, but of a diameter larger than that of said shaft in allowing for a free rotation thereabout, and of a rigidity and strength to provide a resistance to any bending moment tending to be produced on said support members by the compressive force translated thereto through said compressible spring.

6. The safety shield of claim 5 wherein said protective shield is composed of a Lexan polycarbonate material.

* * * * *